TRAFFIC DATA MONITORING APPARATUS

Filed May 11, 1962 2 Sheets-Sheet 1

INVENTORS R. A. SHAPIRO
W. SHAW
BY Howard R. Popper
ATTORNEY

TRAFFIC DATA MONITORING APPARATUS

Filed May 11, 1962 2 Sheets-Sheet 2

INVENTORS R. A. SHAPIRO
W. SHAW
BY Howard R Popper
ATTORNEY

United States Patent Office 3,158,843
Patented Nov. 24, 1964

3,158,843

TRAFFIC DATA MONITORING APPARATUS

Roy A. Shapiro, Far Rockaway, N.Y., and William Shaw, Middletown, N.J., assignors to Bell Telephone Laboratories, Incorporated, New York, N.Y., a corporation of New York Filed May 11, 1962, Ser. No. 194,065
13 Claims. (Cl. 340—174)

This invention relates to equipment monitoring and data recording apparatus and, more particularly, to high speed electronic monitoring apparatus which is compatible with electromechanical devices.

Analysis of the various factors and conditions affecting business operation requires the accumulation of large quantities of statistical data. In the telephone industry, for example, studies are conducted regularly and periodically to accumulate data with regard to telephone equipment utilization. Interpretation of the accumulated data facilitates the proper assignment and disposition of the various telephone lines and equipments, determines the quantities of equipment necessary to handle given volumes of telephone traffic, and provides for future planning with regard to probable telephone equipment requirements. Thus, sufficiency of present units of equipment may be determined, units may be relocated to areas of greater need, additional units may be allotted, and the number of circuits between central offices may be altered, or other appropriate action taken, to provide optimum service consistent with over-all economy of operation.

The data obtained in these studies may be of various types. One of the principal types of telephone traffic data—the type discussed herein by way of illustration—relates to equipment usage in terms of traffic volumes, or peg counts. Peg count data provides information on how many calls were made or how often particular units of equipment were used in a given period of time. This type of traffic data is generally obtained by connecting monitoring apparatus to the various units of telephone equipment to be observed and registering an indication upon the appearance of a predetermined condition at the unit of equipment. However where, as is particularly the case in the majority of telephone traffic studies, the indications to be counted are derived from electromechanical relay contacts, certain problems arise in conjunction with accurately detecting and registering the indications on sensitive high speed electronic monitoring and recording apparatus. One of these problems arises from the phenomenon of relay contact chatter, i.e., the uncontrolled bouncing of relay contacts occurring on the energization of the relay. This chatter may persist for periods up to 20 milliseconds, producing an indeterminate number of contact closures before the relay contacts stabilize in the proper closed position. Assuming that the monitoring apparatus is to detect and record only a single indication corresponding to a discrete energization of the particular relay, it is obvious that the bouncing back and forth of the relay contacts may lead to multiple and erroneous registrations.

The problem of relay contact chatter is further complicated by the fact that peg count indications are necessarily provided to the monitoring equipment on a random time basis; that is to say, there is no correlation in time between the peg count indications from the various equipment units being monitored. Moreover, the indications from the various units of equipment may be of random duration and the relay contact chatter incident to each indication may be of varying duration.

Known data monitoring and recording apparatus, although satisfactory in operation for many purposes, are undesirable in that they employ inhibit or delay circuitry and scanning circuitry which complicates the structure of the monitoring apparatus, thereby increasing the size and cost. Moreover, known arrangements employing scanning circuitry are limited in the number of equipment units which may be monitored by a single monitoring apparatus. The necessity for scanning storage devices associated with each of the equipment units at least as often as the minimum interval of time between successive pulse indications therefrom necessitates that more than one monitoring apparatus be employed to provide the desired facilities with the attendant consequence of additional cost and bulk. Accordingly, it is a general object of this invention to provide a simple, economical, and compact circuit arrangement for accurately monitoring random input signals from a plurality of equipment units.

More particularly, it is an object of this invention to provide monitoring apparatus for accurately detecting random input signals corresponding to the energization of electromechanical relay devices and ignoring relay contact chatter therefrom.

The above and other objects are attained in an illustrative embodiment of the present invention in which an array of magnetic cores is utilized to monitor a plurality of units of equipment, such as telephone markers, senders, trunks or lines, to obtain traffic peg count data in a form suitable for subsequent processing by automatic data processing equipment. An individual control lead emanating from each unit of equipment being monitored is connected in circuit with an associated core in the array. When a unit of equipment assumes, say the "seized" condition, such as through the energization of a relay in the equipment unit, an associated contact is closed by the relay to connect battery to the control lead. A signal thus appears on the control lead for the duration of the relay energization. However, rather than providing a single distinct signal on the control lead for each relay energization, the relay contact initially bounces back and forth producing an indeterminate number of contact closures before stabilizing in the closed position. Each such contact closure produces a sharpened current pulse through a resistance-capacitance arrangement connected in circuit with the contact and the magnetic core. The current pulse produced by the initial contact closure sets the core producing an output indication corresponding to the discrete relay energization, which in turn corresponds to the occurrence of the "seized" condition at the unit of equipment individually associated with the core. The core is then reset in sufficient time to respond to a subsequent appearance of the "seized" condition at the associated equipment unit, but not in time to respond to the remaining current pulses, if any, inadvertently produced by the contact chatter.

In accordance with an important aspect of our invention, the monitoring apparatus is rendered insensitive to the effects of contact chatter through utilization of a continuously operating reset clock connected to a reset winding common to each of the magnetic cores in the array. The reset clock provides a train of consecutive reset pulses to each of the cores, individual of the pulses being insufficient to reset a core. A core is the array is reset only by the cumulative effect of a plurality of the reset pulses occurring over a period of time longer than the duration of the contact chatter. Thus, a core in the array is set upon the initial closure of the contact in circuit therewith and is not reset until the chatter therefrom subsides, thereby precluding the possibility of the core being reset and set again during the period of contact chatter. This manner of resetting the magnetic cores through a continuously operating reset clock, therefore, prevents multiple and erroneous outputs for a single relay energization, while dispensing with any necessity for correlation between the detection of the input indications and the application of the reset pulses to the various magnetic cores, as required by known arrangements.

Accordingly, it is the feature of this invention that a data monitoring apparatus comprise an array of magnetic cores individually associated with a plurality of data sources so that each core may be set by a signal from the associated data source to produce a corresponding output signal and so each of the cores is responsive to the cumulative effect of a plurality of reset pluses to reset only during a predetermined interval after an output signal is produced thereby.

It is a further feature of this invention that a data monitoring apparatus include a magnetic core individually associated with an equipment unit to be monitored and arranged to provide an output signal in response to an input pulse indication derived from the closure of a relay contact associated with the equipment unit, and circuitry including the magnetic core and a reset clock continuously delivering reset pulses to the cores irrespectively of the occurrence of the input pulses for preventing contact chatter in the input pulse indications from producing false output signals.

Another feature of this invention relates to the use of an independently operative reset clock for providing a train of consecutive reset pulses to a plurality of magnetic cores, which pulses are cumulatively effective to reset individual of the cores only a predetermined time after the core is set.

These and other objects and features of the present invention will be better understood upon a consideration of the following detailed description and the accompanying drawing in which.

Figure 1:
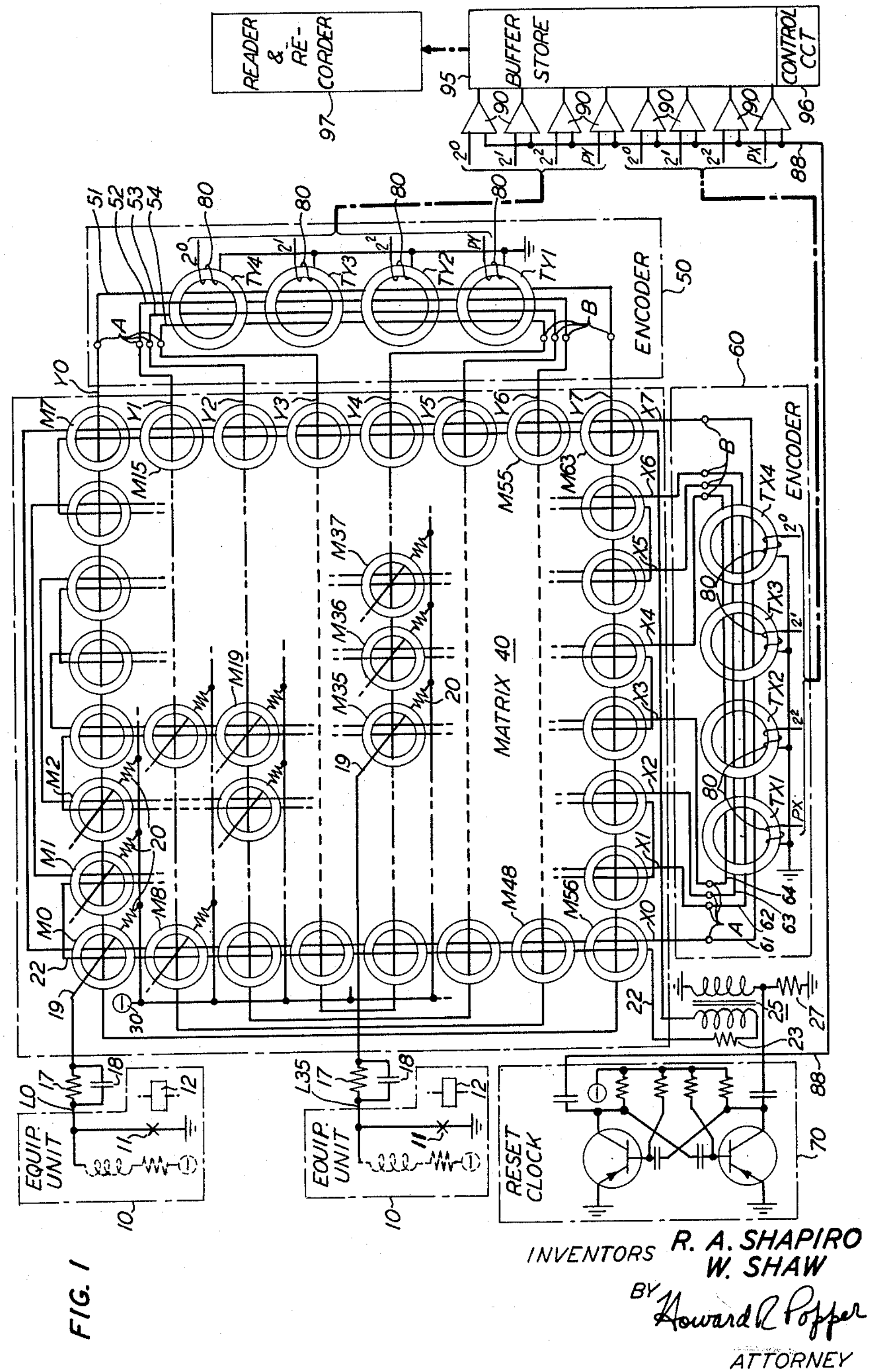
FIG. 1 is a schematic diagram of an illustrative traffic measurement circuit employing data monitoring apparatus in accordance with the principles of our invention.
Figure 3:
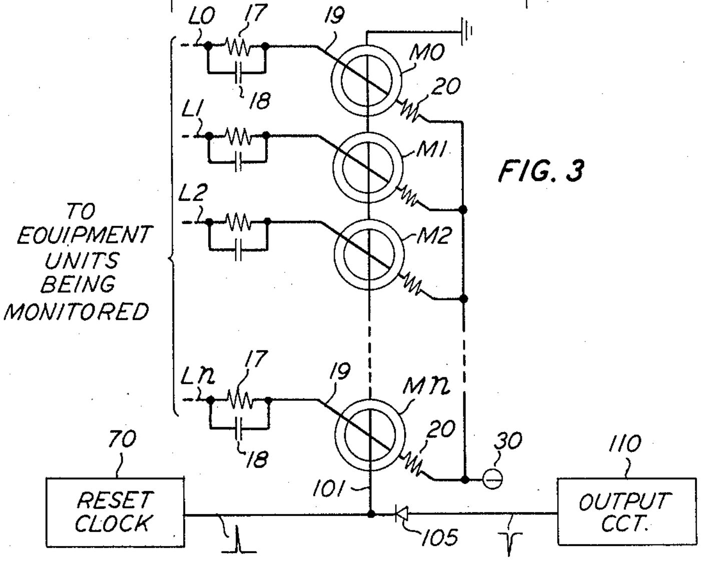
FIG. 3 is a schematic diagram of an illustrative data monitoring apparatus arranged for totalizer applications in accordance with the principles of our invention.

The illustrative embodiments of FIGS. 1 and 3 and the following description are directed toward data monitoring apparatus for collecting statistical traffic data from a plurality of telephone equipments. It is desired to point out, however, that our invention may also be employed to advantage in a wide range of data monitoring applications, particularly those requiring the "funneling" of data from a plurality of electromechanical devices to a single electronic registering or recording apparatus. For example, our invention may be utilized to monitor telephone message unit indications for billing purposes, or to monitor indications in various telemetering applications for billing or statistical purposes.

Reference is now made to FIG. 1 of the drawing wherein is depicted a specific embodiment of a traffic data measurement circuit advantageously employing the principles of our invention. The illustrative embodiment depicted is a circuit arrangement for monitoring traffic usage indications from a plurality of telephone equipment units 10, of which only two are shown in FIG. 1 for purposes of clarity and to facilitate description of the invention. Each of equipment units 10 includes a normally-open relay contact 11 which closes upon the particular equipment unit assuming a condition being monitored. For example, equipment units 10 may comprise individual telephone trunk circuits or groups of trunk circuits, and the condition to be monitored may be one of seizure for use. The seizure of equipment unit 10 energizes relay 12, closing associated contact 11 to connect a reference potential to the individual control lead, such as control lead L0, emanating from the particular seized equipment unit. Contact 11 may be utilized exclusively for this purpose, or as indicated by the dashed line portion of equipment unit 10, contact 11 may also be employed to operate other resistive or inductive loads. The embodiment in FIG. 1 functions to detect the presence of the reference potential on the control lead due to the closure of contact 11 and to record an equivalent binary notation thereof, uniquely identifying the seized equipment unit 10. The recorded binary notations may be summarized subsequently by automatic traffic data processing equipment, such as that disclosed in F. M. Goetz et al. application Serial No. 136,880, filed September 8, 1961, to provide a count of the traffic volume using the individual equipment units during the period of observation.

Each equipment unit 10 is individually associated with an arbitrary one of a plurality of magnetic cores in matrix 40, which is depicted generally in symbolic form with only so much detail as is necessary for a complete understanding of our invention. The magnetic cores in matrix 40 may be of the well-known type exhibiting substantially rectangular hysteresis characteristics, and they are arranged in a coordinate array of rows and columns such that each magnetic core in matrix 40 is defined by a row and column coordinate. For purposes of the present description, matrix 40 in the illustrative embodiment of FIG. 1 is depicted as comprising magnetic cores M0 through M63, a number sufficient to monitor sixty-four equipment units 10 to provide peg count data to reader and recorder 97 in the manner described below.

The individual control lead emanating from each equipment unit 10 is connected through a coupling circuit including a resistor 17 and a capacitor 18 to an input winding 19 threaded on a single-turn basis through the associated one of magnetic cores M0 through M63. The other end of input winding 19 is connected through resistor 20 to reference potential source 30. Thus, for example, control leads L0 and L35 from respective equipment units 10 are each connected to the input winding 19 of the associated magnetic cores M0 and M35, as shown in FIG. 1. Other equipment units 10 (not shown) are individually connected in a similar manner to input windings 19 of magnetic cores M1 through M34 and M36 through M63. In addition to input windings 19, each of magnetic cores M0 through M63 is threaded on a single-turn basis by coordinate row and column conductors, row conductors Y0 through Y7 threading the respective rows and column conductors X0 through X7 threading the respective columns. A single reset conductor 22 serially threads the cores of matrix 40 in one direction along one column, returning in the other direction along the adjacent column. One end of reset conductor 22 is connected through current-limiting resistor 23 to one end of the output winding of impedance-matching transformer 25, and the other end of reset conductor 22 is connected to the other end of the transformer output winding. The input winding of transformer 25 is connected in parallel with resistor 27 to reset clock 70. Reset clock 70 may comprise pulse generation circuitry of a kind well known in the art, such as the astable multivibrator shown in FIG. 1, capable of providing reset pulses with the characteristics to be described.

As mentioned above, the statistical indications from equipment units 10 appear in the form of electrically indistinguishable signals on the respective control leads L0 through L63. To identify each indication as to its respective origin, the coordinate row and column conductors threading the cores associated with the equipment units are connected to encoders 50 and 60, respectively. Encoders 50 and 60 function to identify each indication to provide an equivalent binary code notation particularly designating the equipment unit from which the indication obtained, and may be advantageously of the type described more fully in M. I. Gasper patent application Serial No. 194,023, filed of even date herewith. The equivalent binary code notations from encoders 50 and 60 are applied through buffer store 95 to reader and recorder 97 for recording on a final storage medium for subsequent processing by automatic data processing equipment. Buffer store 95, and control circuit 96 therefor, may comprise circuitry known in the art for receiving data at a random rate and for asynchronously advancing the data along a group of successive storage cells to a final storage cell from which the data is directed at a proper rate for recording. Suitable buffer store and control circuitry is described, for example, in D. H. Barnes patent application Serial No. 1,602, filed January 11, 1960, now Patent 3,099,819, issued July 30, 1963. Recorder 97 may comprise well-known circuitry for recording or punching data on a storage medium such as magnetic tape or paper tape.

Each of row conductors Y0 through Y7 threaded through the respective rows of matrix 40 is connected at one end to encoder 50. Each of column conductors X0 through X7 threaded through the respective columns of matrix 40 is connected at one end to encoder 60. Encoders 50 and 60 include transformer cores TY1 through TY4 and transformer cores TX1 through TX4, respectively, each transformer core corresponding to a binary bit slot in the equivalent binary notations provided to buffer store 95. Each of the transformer cores has associated therewith an output winding 80, one end of which is connected to ground potential and the other end of which is connected to a respective one of amplifiers 90. Output windings 80 may be multiple turn windings, as shown in FIG. 1, to provide the desired output potential levels. Transformer cores TY2 through TY4 and transformer cores TX2 through TX4 correspond to information bit slots in the binary output notations, the numeral adjacent the output winding indicating the relative weight of a binary bit of information appearing therein. Transformer cores TX1 and TY1 are provided for parity-checking purposes and correspond to parity bit slots in the output notations, as indicated by the designations PX and PY adjacent the respective output windings.

Encoder input conductors 51 through 54 and 61 through 64 are threaded through transformer cores TY1 through TY4 and TX1 through TX4, respectively, in accordance with a binary code in a manner so as to take advantage of the complementary nature of binary numbers. More particularly, each encoder input conductor is threaded through each transformer core of the respective encoder such that a signal applied to one end of an input conductor is reflected through the transformer cores to produce a first binary output notation, and a like signal applied to the other end of the same input conductor is reflected through the transformer cores to produce a second binary output notation which is the complement of the first. For example, a positive-going signal applied to terminal A of conductor 53 of encoder 50 is reflected through transformer cores TY1 through TY4 to provide the binary output notation "0010"; and a positive-going signal applied to terminal B thereof produces the complementary binary output notation "1101." This "double-ended complementary binary" manner of threading the encoder transformer cores, and the advantages thereof, are more fully disclosed in the above-identified Gasper patent application.

Accordingly, the row conductors and the column conductors of matrix 40 are respectively paired, each pair comprising two row conductors or two column conductors having complementary binary designations in accordance with their coordinate locations in matrix 40. The paired row conductors and the paired column conductors are connected to opposite terminals of respective ones of encoder input conductors 51 through 54 and 61 through 64, such that a positive-going signal on one row or column conductor of a pair connected to terminal A produces a first binary output notation uniquely identifying the one conductor; and a positive-going signal on the other row or column conductor of the pair connected to terminal B produces a complementary binary output notation uniquely identifying the other conductor. The coordinate identification of a row conductor and a column conductor in this manner defines a particular magnetic core in matrix 40, and thus the individual equipment unit 10 arbitrarily associated therewith.

Figures 2A, 2B, 2C, 2D, 2E:
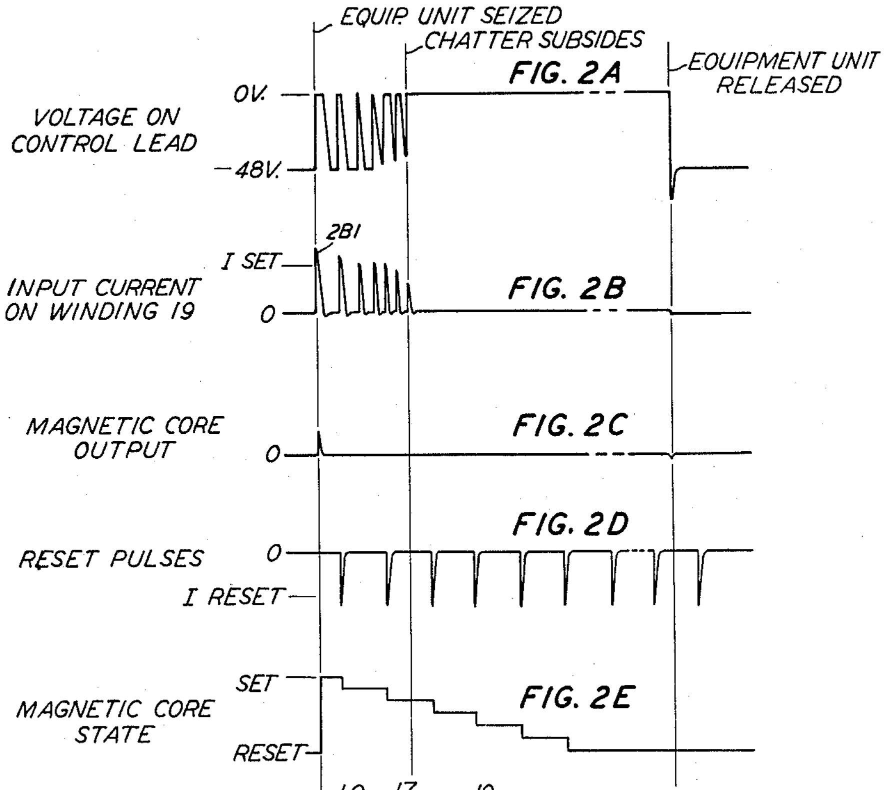
FIGS. 2A through 2E are graphical representations of various waveforms useful in describing the operation of the embodiments of FIGS. 1 and 3.

With the structure of FIG. 1 in mind, the operation thereof will now be considered with reference to the illustrative waveforms shown in FIGS. 2A through 2E. For the purposes of this description, each of equipment units 10 will be assumed to be operative independently of every other equipment unit to provide peg count indications at a random rate on the control lead therefrom. It will be recalled that a peg count indication appears as a change of potential on one of control leads L0 through L63 (of which only L0 and L35 are shown) as a result of the closure of contact 11 in circuit therewith. Before relay 12 controlling contact 11 is energized by seizure of the particular equipment unit 10, the potential on the control lead is determined by potential source 30. Upon seizure of the equipment for use, and thus closure of contact 11, the control lead is directly connected through contact 11 to ground potential. However, the energization of relay 12 by a single equipment seizure may result, not in a single closure of contact 11, but rather in an indeterminate number of damped contact closures due to the chatter of contact 11. As mentioned above, this contact chatter may persist for periods up to 20 milliseconds in duration. Thus, as illustrated in FIG. 2A, a discrete relay energizing signal corresponding to a single equipment seizure indication produces an indeterminate number of potential changes on the control lead, varying between the potential determined by source 30 and ground potential. After contact 11 stabilizes in the closed position and the chatter subsides, the control lead remains at ground potential for a period of several hundred milliseconds until the equipment unit is released, deenergizing relay 12 to release contact 11.

Each of control leads L0 through L63 is connected in circuit with an input winding 19 of a respective one of magnetic cores M0 through M63 via a differentiator circuit including capacitor 18 and resistors 17 and 20. Magnetic cores M0 through M63 are normally in a reset state. For each closure of contact 11 in a control lead, the differentiator circuit develops a current pulse on winding 19 of the core in circuit therewith. Thus, for each energization of relay 12 in an equipment unit 10, an indeterminate number of current pulses are developed on winding 19, as shown in FIG. 2B, corresponding to the indeterminate number of damped contact closures produced by chatter of contact 11. The first current pulse 2B1, produced by the initial closure of contact 11, sets the associated one of magnetic cores M0 through M63 to a first state of magnetic remanence and produces an output pulse, as illustrated in FIG. 2C, on the coordinate row and column conductors threading the respective core.

The successive current pulses developed on winding 19 by the chatter of contact 11 may also be of sufficient magnitude and duration to set the associated magnetic core. Therefore, if the core is reset during the period of contact chatter, it will be set again by one of these successive current pulses to produce a corresponding output pulse on the coordinate row and column conductors. To preclude such additional and false outputs produced by chatter of contact 11, each core is reset only after the cessation of the chatter of contact 11 in circuit therewith, and thus after the last of the indeterminate number of current pulses produced thereby on winding 19. Reset clock 70 is continuously operative to provide a train of consecutive reset pulses through transformer 25 to reset winding 22, as illustrated in FIG. 2D. The individual reset pulses are of insufficient duration to reset the magnetic cores in matrix 40. However, a predetermined plurality of consecutive reset pulses are cumulatively effective to switch a magnetic core from the set state to the reset state. Thus, the time of resetting an individual magnetic core in matrix 40 is readily determined to occur only after the last of the pulses developed on winding 19 by a single seizure of the associated equipment unit 10, but before the release and a subsequent seizure of the equipment unit. In this manner, the individual magnetic cores in matrix 40 are each maintained in the reset state until respectively set by a current pulse 2B1 on input winding 19; and once in the set state, a magnetic core is slowly reset by a predetermined number of consecutive reset pulses occurring over a period of time longer than the duration of the contact chatter appearing on the associated control lead.

For example, assuming that the maximum period of contact chatter is 20 milliseconds and assuming that the minimum time between successive seizures of an equipment unit 10 is 100 milliseconds, the circuit parameters of reset clock 70 may be such as to advantageously provide reset pulses which are cumulatively effective to reset a magnetic core approximately 50 to 60 milliseconds after the setting of the core. As illustrated in FIG. 2D, this is accomplished in the embodiment of FIG. 1 by reset clock 70 providing reset pulses on winding 22 to each of the cores in matrix 40 at a 100 p.p.s. rate, i.e., one reset pulse every 10 milliseconds. The individual reset pulses are of a magnitude and duration such that six consecutive pulses are required to reset a core, as illustrated in FIG. 2E, these six reset pulses being provided to the core over a period of approximately 50 milliseconds. The reset pulses provided by reset clock 70 are entirely independent of, and are not correlated in any manner with, the seizures of the respective equipment units 10 or the setting of the associated magnetic cores M0 through M63. Rather, a train of reset pulses from clock 70 is continuously provided to each of cores M0 through M63 via reset winding 22.

The setting of one of magnetic cores M0 through M63, as mentioned above, produces an output pulse on the coordinate row and column conductors threaded therethrough. The output pulse on the row conductor is reflected through transformer cores TY1 through TY4 to provide on output windings 80 thereof a binary encoded notation, inclusive of parity bit, which uniquely identifies the particular row conductor. Similarly, the output pulse on the column conductor is reflected through transformer cores TX1 through TX4 to provide on output windings 80 thereof a binary encoded notation, inclusive of parity bit, which uniquely identifies the particular column conductor. The resultant eight-bit binary notation identifying the core threaded by the particular coordinate row and column conductors, and thus identifying the equipment unit 10 arbitrarily associated therewith, is directed through amplifiers 90 to buffer store 95. The notation is advanced asynchronously through buffer store 95 and is recorded on a final storage medium by reader and recorder 97, as is described, for example, in the above-identified D. H. Barnes patent.

To prevent any chance of mutilation of the binary notations from encoders 50 and 60 due to the reset pulses from reset clock 70 being reflected through magnetic cores M0 through M63 to the encoder input conductors 51 through 54 and 61 through 64, amplifiers 90 are enabled advantageously to transfer the notations from encoders 50 and 60 to buffer store 95 only during the intervals between successive reset pulses on winding 22. This is accomplished in FIG. 1 by enabling amplifiers 90 via clock pulses on lead 88 from reset clock 70, which clock pulses are provided on lead 88 alternately in time with the provision of reset pulses on winding 22.

To more fully understand the operation of the illustrative monitoring apparatus of FIG. 1, assume that magnetic core M0 is initially in the reset state and that equipment unit 10 connected to control lead L0 is seized for use. The seizure of equipment unit 10 energizes relay 12 to close contact 11 to connect ground potential to control lead L0. The initial closure of contact 11 results in a voltage rise on control lead L0 from the negative potential of source 30 to ground potential. This initial voltage rise results in a current pulse 2B1 on winding 19, inducing a clockwise flux in magnetic core M0 of sufficient magnitude and duration to switch core M0 to the set state in a manner well known in the art. The setting of magnetic core M0 produces a positive-going output pulse on row conductor Y0 and on column conductor X0 threaded therethrough. The output pulse on row conductor Y0 is applied at terminal A to input conductor 51 of encoder 50, and is reflected through transformer cores TY1 through TY4 inducing the binary notation "1000" on output windings 80. The output pulse on column conductor X0 is applied at terminal A to input conductor 61 of encoder 60, and is reflected through transformer cores TX1 through TX4 in a similar manner to induce the binary notation "1000" on output windings 80 thereof. Thus, the binary notation "10001000" appears on output windings 80 from encoders 50 and 60 which uniquely identifies the magnetic core M0, and therefore the equipment unit 10 arbitrarily associated therewith via control lead L0. The binary notation "10001000" is the equivalent encoded notation, inclusive of parity bits, for a peg count indication from that particular equipment unit 10, and is gated through amplifiers 90 to buffer store 95 by clock pulses on lead 88 from reset clock 70. The binary notations derived through magnetic core M0, as well as those derived from cores M1 through M63, are advanced through buffer store 95 and recorded by reader and recorder 97 for subsequent processing by automatic data processing equipment.

The pulses developed on winding 19 of core M0 subsequent to pulse 2B1, due to contact chatter appearing on control lead L0, are ignored and produce no output pulses of row conductor Y0 and column conductor X0. Reset pulses are continuously provided to core M0 from reset clock 70 via winding 22 at a rate, for example, of one reset pulse every 10 milliseconds. The reset pulses on winding 22 are of a magnitude and duration such that six reset pulses are required to be cumulatively effective to reset core M0. Thus, at some time less than 10 milliseconds after the setting of core M0, and entirely independently of the setting operation, the first reset pulse on winding 22 will be applied to core M0. This first reset pulse after the setting of core M0 initiates the first step of the cumulative resetting operation. Subsequent reset pulses are applied on winding 22 to core M0 at intervals of 10 milliseconds until a total of six reset pulses have been applied thereto. At this point in time, greater than 50 milliseconds and less than 60 milliseconds after the setting of core M0, contact chatter on lead L0 has subsided and core M0 is completely switched to the reset state of magnetic remanence. Core M0 is back to its normal reset state and ready to receive subsequent indications on control lead L0. The reset pulses on winding 22 continue to be applied to core M0 to maintain it in the reset state until subsequent seizure of equipment unit 10 associated therewith.

Although the above description of an illustrative embodiment has assumed the resetting of individual of the magnetic cores 50 to 60 milliseconds after the setting thereof, it will be apparent that other intervals between setting and resetting may be readily provided in accordance with particular applications by suitable adjustment of the circuit parameters of reset clock 70. Moreover, if desired, the resetting of a core can be prevented until after the associated equipment unit has released, opening contact 11. For the duration of closure of contact 11, a direct current bias path is completed through input winding 19 and resistors 17 and 20. The temporary bias applied thereto from source 30 is in a direction opposing the reset of the core, and may be of a value as to prevent the reset pulses from resetting the core until after the opening of contact 11.

In FIG. 3 is illustrated a circuit arrangement for monitoring a plurality of equipment units to totalize count indications therefrom, without regard as to the identity of the individual units from which the indications obtain. The structure and operation of the embodiment of FIG. 3 is similar to that of the embodiment of FIG. 1, and similar circuit elements have been indicated by like designations. Each of magnetic cores M0 through M*n* is individually associated via a respective one of control leads L0 through L*n* with an equipment unit being monitored. Each core is arranged to be set by a signal on the associated control lead indicative of a predetermined condition being monitored. The signals on control leads L0 through L*n* are derived from respective electromechanical relay contacts in circuit therewith, and each signal may include a period of contact chatter, such as shown in FIG. 2A. A continuous train of reset pulses from reset clock 70 are applied to magnetic cores M0 through M*n* via conductor 101 threaded through each of the cores. In this regard, conductor 101 corresponds to reset winding 22 in the embodiment of FIG. 1. Magnetic cores M0 through M*n* are each reset, in the manner described in connection with FIG. 1, by the cumulative effect of a plurality of reset pulses on winding 101 occurring over a period greater than that of the contact chatter on the respective control lead L0 through L*n*. Conductor 101 also serves as a common output winding for cores M0 through M*n*. The setting of one of cores M0 through M*n* by a signal on the respective control lead L0 through L*n* induces an output pulse on conductor 101, the polarity of which is opposite to that of the reset pulses appearing on conductor 101. Output circuit 110 is connected to conductor 101 through an asymmetrically conducting device, such as diode 105, which is properly poled to block the reset pulses and to pass the output pulses. Output circuit 110 may include suitable pulse counting or recording circuitry known in the art.

It is to be understood that the above-described arrangements are merely illustrative of the application of the principles of the invention. Numerous other arrangements may be devised by those skilled in the art without departing from the spirit and scope of this invention.

What is claimed is:

1. Traffic monitoring apparatus comprising a plurality of traffic responsive circuits providing a succession of discrete relay energizing signals to individual relays, each said relay controlling electromechanical contacts which develop an indeterminate number of damped contact closures in response to each said discrete energizing signal, means in circuit with said contacts for developing a pulse for each said contact closure, a bistable state magnetic core in circuit with said contacts, said pulse being of sufficient magnitude to set said core to a first state of magnetic remanence, and pulse means operative independently of said relay energizing signals for providing a plurality of consecutive reset pulses individually insufficient to reset said core to its second state of magnetic remanence, said core being resettable by a predetermined number of said reset pulses occurring over a period of time longer than the duration of said damped contact closures.

2. Monitoring apparatus for counting successive operational manifestations of each of a plurality of circuits, a plurality of two-state magnetic cores respectively associated with said plurality of circuits and threaded by a common output winding, individual input means applying a plurality of set pulses to a respective magnetic core for each operational manifestation of the associated circuit, the switching of the respective magnetic core to a first state by a set pulse providing a signal on said output winding, and reset means operative to individually switch said cores to a second state only after the application of the last of said plurality of set pulses to said core, said reset means including means operative independently of said operational manifestations for continuously applying a plurality of said pulses to each of said cores, said plurality of pulses being cumulatively effective to switch a core in said first state to said second state.

3. Traffic monitoring apparatus comprising a plurality of traffic responsive circuits providing a succession of discrete relay energizing signals to individual relays, each said relay controlling electromechanical contacts which develop an indeterminate number of damped contact closures in response to each said discrete energizing signal, potential means in circuit with said contacts, differentiator means in circuit with said contacts for developing a pulse for each said contact closure, a bistable state magnetic core in circuit with said differentiator means and said contacts, said pulse being of such magnitude to set said core to a first state of magnetic remanence, and means for resetting said core only after the cessation of said damped contact closures, said resetting means including reset pulse means operative independently of said relay energizing signals to provide a plurality of consecutive reset pulses to said core, individual of said reset pulses being insufficient to reset said core to its second state of magnetic remanence.

4. Monitoring apparatus for counting successive seizures of each of a plurality of equipment units comprising an array of magnetic cores each having two alternative states of magnetic remanence, an input winding individual to each of said cores, means associating each of said equipment units with a respective one of said cores, said means developing an indeterminate number of current pulses on the input winding of a respective core for each seizure of the associated equipment unit, each said current pulse being sufficient to switch said core to a first state of magnetic remanence, a conductor threading each of a plurality of said magnetic cores to provide an output signal in response to any one of said cores threaded thereby being switched to said first state, means responsive to said output signals, and means operative independently of said equipment seizures to individually switch said core to a second state of magnetic remanence between successive seizures of the associated equipment unit, said means including a pulse generator applying a plurality of reset pulses in common to said cores and cumulatively effective to switch individual of said cores to said second state of magnetic remanence only after the last of said indeterminate number of current pulses developed on the input winding thereof by seizure of the associated equipment unit.

5. Monitoring apparatus comprising a plurality of input conductors individually connected to respective electromechanical input means, output means, an array of magnetic cores individually connected to said plurality of input conductors and individually responsive to the operation of said respective electromechanical input means to switch to a first stable state, a common output conductor threaded through said cores for providing a signal to said output means in response to the switching of individual of said cores to said first stable state, and means connected to each of said cores and operative to switch individual of said cores to a second stable state at least a predetermined interval of time after said individual core is switched to said first stable state, said last-mentioned means including pulse means for switching said cores to said second stable state in a predetermined plurality of steps.

6. Monitoring apparatus comprising a plurality of input conductors individually connected to respective relay input means, said relay input means providing a set pulse and an indeterminate number of chatter pulses for each discrete operation thereof, output means, an array of magnetic cores individually connected to said plurality of input conductors and individually responsive to said set pulse for each discrete operation of said respective electromechanical input means to switch to a first stable state, a common output conductor threaded through each of said cores for providing a signal to said output means in response to the switching of individual of said cores to said first stable state, continuously operating pulse means providing a train of consecutive pulses individually insufficient to switch said magnetic cores to a second stable state, and means including said pulse means for individually switching said cores to said second stable state between successive discrete operations of said relay input means connected thereto and for preventing said chatter pulses from falsely switching said cores to said first stable state.

7. Monitoring apparatus comprising a plurality of signaling channels each providing a succession of discrete bursts of signals to be counted, an array of magnetic cores individually associated with said channels, each of said cores having a set and a reset state and being operable to said set state in response to the first signal in a discrete burst of signals on the associated signaling channel connected thereto, a common output lead, means connected to each of said cores and responsive to the operation of individual of said cores to said set state to provide a signal on said common output lead, and means for resetting the individual cores between successive discrete bursts of signals on said associated signaling channels, said resetting means including a reset clock for continuously applying reset pulses to each of said cores of insufficient energy to individually reset said cores, a plurality of said reset pulses being cumulatively effective to reset individual of said cores only after the cessation of a discrete burst of signals on the associated signaling channel.

8. Monitoring apparatus comprising a plurality of signaling channels each including an electromechanical device to be monitored, each said device being randomly energized to provide an indeterminate number of pulses on the particular signaling channel for each discrete energization, a plurality of magnetic cores individually associated with said channels and having first and second stable states, means for setting individual of said cores to said first stable state in response to the appearance of a pulse on said associated signaling channel, an output terminal, output means connected to each of said cores and responsive to the setting of individual of said cores to said first state to provide an output signal to said output terminal, pulse means continuously providing a train of pulses to each of said cores at a predetermined repetition rate, each of said cores being responsive to a plurality of successive pulses from said pulse means to operate to said second stable state only after the last of said indeterminate number of pulses on the associated signaling channel produced by a discrete device energization.

9. Apparatus for monitoring successive appearances of an operative condition occurring at a random rate on each of a plurality of individual input circuits comprising a coordinate array of magnetic cores individually associated with said input circuits, means for setting individual ones of said cores in response to the appearance of said operative condition on the associated input circuit, means connected to said magnetic cores and operative upon the setting of a core to provide an output signal particularly identifying said set core, a common reset lead threading each of said cores, means for providing reset pulses at a fixed repetition rate substantially greater than the random rate of signals from said individual input circuits, and means for continuously applying said reset pulses to each of said cores, said cores resetting individually only in response to a predetermined plurality of said reset pulses.

10. Signal monitoring apparatus comprising an array of magnetic cores arranged in coordinate rows and columns, each of said cores having two alternative states of magnetic remanence and adapted to be switched to one of said states by a first pulse and to the other of said states by a plurality of second pulses, row and column leads threading the respective rows and columns of said array, the switching of a core to said one state by a first pulse producing an output signal on the row and column lead threading said core, individual means for applying input signals being monitored to respective ones of said magnetic cores, each said input signal including a plurality of said first pulses occuring over an interval less than a predetermined time interval, and common resetting means including means for applying a continuous train of said second pulses to each of said magnetic cores, a plurality of said second pulses occurring over an interval greater than said predetermined time interval cumulatively resetting individual of said cores.

11. Monitoring apparatus comprising a magnetic core having a set and a reset state, a first conductor and a second conductor inductively coupled to said core, means for providing input signals to said first conductor at a random rate to be counted, each signal including an indeterminate number of pulses individually sufficient to switch said core to said set state, and reset means operative independently of said input signals to switch said core to said reset state only during the absence of input signals on said first conductor, said reset means including means for providing a train of consecutive reset pulses to said second conductor individually insufficient to switch said core to said reset state, said core switching to said reset state only in response to a predetermined plurality of said consecutive reset pulses.

12. Monitoring apparatus in accordance with claim 11 wherein said input signal means comprises a relay contact in circut with said first conductor, a potential source in circuit with said contact, and differentiator means in circuit with said contact, the closure of said contact producing said input signals to be counted.

13. Monitoring apparatus in accordance with claim 11 further comprising output means connected to said second conductor and responsive to signals induced in said second conductor by the switching of said core to said set state.

No references cited.